US009253145B2

(12) United States Patent
Boehm et al.

(10) Patent No.: US 9,253,145 B2
(45) Date of Patent: Feb. 2, 2016

(54) ELECTRONIC COMPONENT WITH ASSIGNMENT OF AN ADDRESS TO THE COMPONENT

(75) Inventors: Michael Boehm, Graz (AT); Oliver Weber, Shanghai (CN)

(73) Assignee: ams AG, Unterpremstaetten (AT)

( * ) Notice: Subject to any disclaimer, the term of this patent is extended or adjusted under 35 U.S.C. 154(b) by 479 days.

(21) Appl. No.: 13/403,864

(22) Filed: Feb. 23, 2012

(65) Prior Publication Data

US 2012/0215942 A1 Aug. 23, 2012

(30) Foreign Application Priority Data

Feb. 23, 2011 (DE) .......................... 10 2011 012 090

(51) Int. Cl.
G06F 3/00 (2006.01)
H04L 29/12 (2006.01)
G06F 5/00 (2006.01)

(52) U.S. Cl.
CPC .................................. H04L 61/2038 (2013.01)

(58) Field of Classification Search
None
See application file for complete search history.

(56) References Cited

U.S. PATENT DOCUMENTS

| 4,667,191 | A | * | 5/1987 | Comroe et al. | 370/455 |
| 5,675,811 | A | * | 10/1997 | Broedner et al. | 713/323 |
| 6,779,046 | B1 | * | 8/2004 | Osuga | 710/14 |
| 7,908,402 | B2 | * | 3/2011 | Fernald et al. | 710/3 |
| 2005/0154474 | A1 | * | 7/2005 | Kauntz et al. | 700/1 |

FOREIGN PATENT DOCUMENTS

| DE | 100 15 438 | 10/2001 |
| DE | 103 58 106 | 7/2005 |

* cited by examiner

*Primary Examiner* — Henry Tsai
*Assistant Examiner* — Dean Phan
(74) *Attorney, Agent, or Firm* — McDermott Will & Emery LLP

(57) ABSTRACT

An electronic component (10*a*, 10*b*), with assignment of an address to the component, comprises a first terminal (A10*a*) for the application of a first signal (SCL) and a second signal (SDA) different from the first signal, and a second terminal (A10*b*), different from the first terminal, for the application of the first signal (SCL) and the second signal (SDA). Depending on the external connection of the first and second terminals (A10*a*, A10*b*), the component is assigned an address by means of which the component is addressable.

15 Claims, 3 Drawing Sheets

US 9,253,145 B2

ELECTRONIC COMPONENT WITH ASSIGNMENT OF AN ADDRESS TO THE COMPONENT

RELATED APPLICATIONS

This application claims the priority of German application no. 10 2011 012 090.4 filed Feb. 23, 2011, the entire content of which is hereby incorporated by reference.

FIELD OF THE INVENTION

The invention relates to an electronic component in which, depending on an external connection, an address via which the component can be controlled is assigned to the component.

BACKGROUND OF THE INVENTION

Electronic components connected to a bus system are generally addressable via component-specific addresses. If each electronic component connected to the bus has an address of its own, data can be exchanged between, for example, a higher-level control component (master chip) and subordinate components (slave chips) likewise connected to the bus. One such bus system, for example, is the I2C (Inter-Integrated Circuit) bus, in which a higher-level control chip (I2C bus master) and several hierarchically subordinated chip components (I2C bus slaves) communicate with one another via a two-wire interface. The bus comprises one transmission line for transmitting a clock signal and one transmission line for transmitting a data signal. The components connected to the I2C bus can be addressed via their individual addresses.

In some bus systems, such as a USB bus, the addresses to be assigned to the electronic components connected to the bus system are assigned via a protocol when the components are addressed for first time. In other bus systems, such as the I2C bus, on the other hand, there are preset component addresses for the components connected to the bus system that are already assigned to the components during production by programming the relevant hardware. The components can have a ROM memory for example, in which the address assigned to the component during production is written.

If components of the same construction, having the same functionality and internal structure for example, are to be used in such a bus system, and these components have already been assigned individual addresses during production, they are individually different due to the respective address assigned to them, despite identical structure and functionality. When an electronic circuit such as a bus system is being equipped with such components, the components are generally handled individually, which results in an increased logistical expense.

SUMMARY OF THE INVENTION

One object of the invention is to provide an electronic component with assignment of an address to the component in which the address is assigned to the component only during population of the circuit arrangement, a bus system in particular.

In one possible embodiment of the electronic component, the component comprises a first terminal for application of a first signal and a second signal different from the first signal. The component further comprises a second terminal, different from the first terminal, for application of the first signal and the second signal. The component can be operated in a first operating mode, in which the first signal is present at the first terminal and the second signal is present at the second terminal. The component can also be operated in a second operating mode, in which the second signal is present at the first terminal and the first signal is present at the second terminal. The component comprises an address selection unit for assigning at least one first or second address to the component, the address selection unit being constructed in such a manner that the address selection unit assigns the first or second address depending on the operating mode of the component.

In the electronic component, the address assigned to the component is thus determined by the type of external connection, in particular by the manner in which the first signal and the second signal are applied to the first and second terminals. The first and second terminals are external terminals of the component, which are provided in any case for operating the component in its intended manner of operation.

In one possible embodiment of a component, the first terminal and the second terminal can each be constructed for application of a clock signal or for application or output of a data signal. The component can be constructed as a component for performing a read and write access. In particular, the component can be constructed in such a manner that a read and write access to the component is controlled temporally by the clock signal and, in case of a write access to the component, data is written to the component depending on the data signal and, in case of a read access, data is read out of the component.

If the component is connected at the first terminal to a clock signal line of a bus and the second terminal of the component is connected to a data signal line of the bus, these connections can determine that the component is operated in the first operating mode, for example. When the component is operated in the first operating mode, a first chip address is assigned to the component, for example.

On the other hand, if the first and second terminals of the component are connected in the opposite manner to the clock signal and data signal lines, by connecting the first terminal to the data signal line and the second terminal to the clock signal line of the bus, these connections determine that the component is operated in the second operating mode, for example. In the second operating mode, the component is then assigned a second chip address different from the first address.

It is thus possible to define which address is assigned to the component by the respective connection of the component terminals, which are necessary in any case for the application of signals that are necessary for the proper operation of the component, for example, the terminals that are provided for application of a data signal and a clock signal. It is not necessary to provide additional external terminals for defining the address of the component.

DETAILED DESCRIPTION OF THE DRAWINGS

Figure 1:
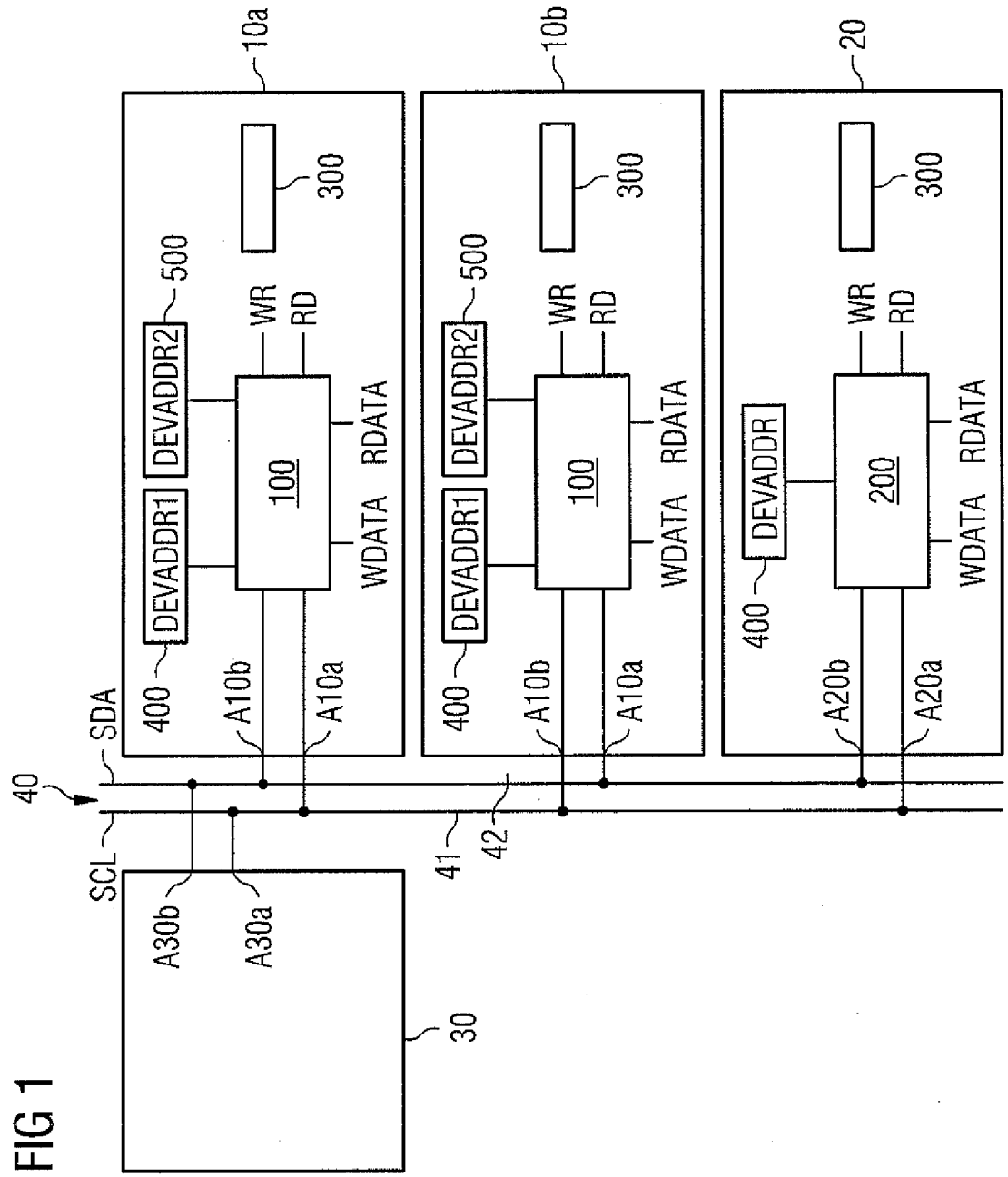
FIG. 1 shows an embodiment of a bus system with electronic components connected to a bus in different ways.

FIG. 1 shows a bus system with several electronic components 10a, 10b, 20 and 30 that are connected to a bus 40. For example, the electronic components can be chip components that contain a chip. The electronic components 10a, 10b and 20 can be hierarchically subordinate components (slaves), for example, that are controlled by the higher-level component 30 (master). The bus 40 can comprise the lines 41 and 42, of which the bus line 41 is provided for transmitting a first signal such as a clock signal SCL, and the bus line 42 is provided for transmitting a second signal such as a data signal SDA.

The two electronic components 10a and 10b are implemented identically in that they have the same functionality and the same structure. The components 10a and 10b have already been assigned the two possible component addresses DEVADDR1 and DEVADDR2, for example, when they were manufactured. The components 10a, 10b can comprise storage devices 400, 500 that can be implemented as ROM memories, for example. The component address DEVADDR1 is stored, for instance, in the memory device 400 and the component address DEVADDR2 in the memory device 500 as fixed addresses during manufacturing of the components.

The components 10a and 10b each have a control device 100 provided for controlling a read and write access to at least one respective memory register 300. The control device 100 is additionally constructed to select one of the preprogrammed component addresses DEVADDR1 and DEVADDR2 and definitively assign it to the respective component 10a and 10b. The selection of which of the two possible component addresses is assigned to the respective component is determined by the different connections of the external terminal A10a and the external terminal A10b.

The two terminals A10a and A10b can each be constructed as terminals that are suitable for both application of a first signal SCL and for application of a second signal SDA different from the first signal. For example, the first signal SCL can be a clock signal, and the second signal a data signal SDA. Both the clock signal SCL and the data signal SDA can be applied to each of the two external terminals by connecting the terminals to the respective bus line 41 or 42.

The control device 100 is constructed to recognize the terminal at which the first signal SCL such as a clock signal is present and the terminal at which the second signal SDA such as a data signal is present. Depending on the determined connections of the external terminals A10a and A10b, the control device 100 selects one of the possible component addresses DEVADDR1 and DEVADDR2 and assigns it to the component.

In the configuration shown in FIG. 1, for example, the component 10a is connected via the terminal A10a to the bus line 41 for transmitting the clock signal SCL and via the terminal A10b to the bus line 42 for transmitting the data signal SDA. When the control device 100 has detected the connections of the terminals of the component 10a, it selects the possible component address DEVADDR1 as the actual component address for the component 10a. The component 10a can thus be addressed in subsequent operation via the DEVADDR1 address.

Just as for the component 10a, the possible component addresses DEVADDR1 DEVADDR2 for the component 10b are stored in the preprogrammed memory devices 400 and 500. In contrast to the component 10a, the terminal A10a for the component 10b is connected to the bus line 42 for transmitting the data signal SDA and the terminal A10b is connected to the bus line 41 for transmitting the clock signal SCL. When the control device 100 has detected these connections of the component, it selects the chip address DEVADDR2, for example, and assigns it to the component 10b. The component 10b can thus be addressed in subsequent operation via the DEVADDR2 address.

If the components 10a and 10b are constructed as components for a read and write access, data can be read out from the memory device 300 or stored in the memory device 300. In case of a write access, for example, the control device 100 generates the internal write command WR. Then data that is supplied to the component 10a at the terminal A10b via the bus line 42 for transmitting the data signals SDA or to the component 10b at the terminal A10a via the bus line 42 is interim-stored in the control device 100 and stored as write data WDATA in the memory device 300. In case of a read access to the memory device 300, the respective control device 100 in each of the two components generates an internal read command RD, whereupon data RDATA is read out from the respective memory device 300, interim-stored in the control device 100 and output via the terminal A10b or A10a to the bus line 42 for transmitting the data signals SDA. For clock-synchronous control of the read and write access, the component 10a is driven by the clock signal SCL at the terminal A10a and the component 10b is driven at the terminal A10b.

The terminals A10a and A10b are external terminals that are provided for the two electronic components 10a and 10b for operating the components in an intended operation. If the two electronic components 10a, 10b are constructed as components for clock-synchronous writing and reading of data, the terminals can each be constructed for application of a clock signal and for application and output of a data signal. Both a clock signal and a data signal can be applied to and read out from each of the terminals. In case of a read access, the data stored in the memory device 300 is output as a data signal SDA at one of the external terminals A10a or A10b. In case of a write access, data of the data signal SDA present at one of the external terminals A10a and A10b is stored in the respective memory device 300.

Depending on the terminal among the components 10a and 10b at which the data signal is present and the terminal at which the clock signal is present, one of the possible addresses is assigned to the respective component. The address to be assigned to the components in subsequent operation is thus only defined upon connection of the terminals A10a and A10b, present on the components in any case for performing an intended operation, to the bus lines 41 and 42. Since the two components 10a and 10b are identical with respect to their internal structure, they can be handled uniformly during production until they have been connected to the bus 40. The logistic effort in producing the electronic components and the bus system arrangement of FIG. 1 is thus markedly less than in an embodiment in which fixed preset addresses are assigned to the two components already during the manufacturing of the components.

In the embodiment according to FIG. 1, the electronic component 20 as well as the electronic components 10a and 10b can be constructed as components for carrying out a read and write access to a memory device 300. The component 20 has a control device 200 for controlling the read and write access to the component 20. In case of a write access, for example, the control device 200 generates the internal write command WR. Then data that is supplied to the component 20 at the terminal A20b via the bus line 42 for transmitting the data signals SDA is interim-stored in the control device 200 and stored as write data WDATA in the memory device 300. In case of a read access to the memory device 300, the control device 200 generates an internal read command RD, whereupon data RDATA is read out from the memory device 300, interim-stored in the control device 200 and output via the terminal A20b to the bus line 42 for transmitting the data signals. For clock-synchronous control of an access to the component 20, the output terminal A20a is connected to the bus line 41 for transmitting the clock signal SCL.

The component address DEVADDR was already assigned to the component 20 during the manufacture of the component 20. For this purpose, the component address DEVADDR is stored in the memory device 400 such as a ROM memory. The component address DEVADDR is already defined in this case by appropriate programming of the memory device 400 during the manufacturing of the component 20.

Both components with a dynamic address assignment, in which the actual component address is assigned by the connections of the external terminals to the bus lines, and electronic components such as the element 20, in which the component address is already defined by programming a single address into the memory device 400 during manufacturing of the components, can be connected to the bus 40.

The higher-level component 30 is provided for controlling a read or write access to component 10a, 10b or 20. A control pulse terminal A30a of the electronic component 30 is connected to the bus line 41 for transmitting the first signal SCL, or the clock signal. The component 30 is connected to the bus line 42 at an additional external terminal A30b for output and application of second signals such as the data signals. In an access to the subordinate slave components 10a, 10b and 20, the master component 30 generates an address assigned to one of the components 10a, 10b and 20 and thereby unambiguously triggers one of the components 10a, 10b or 20.

Figure 2:
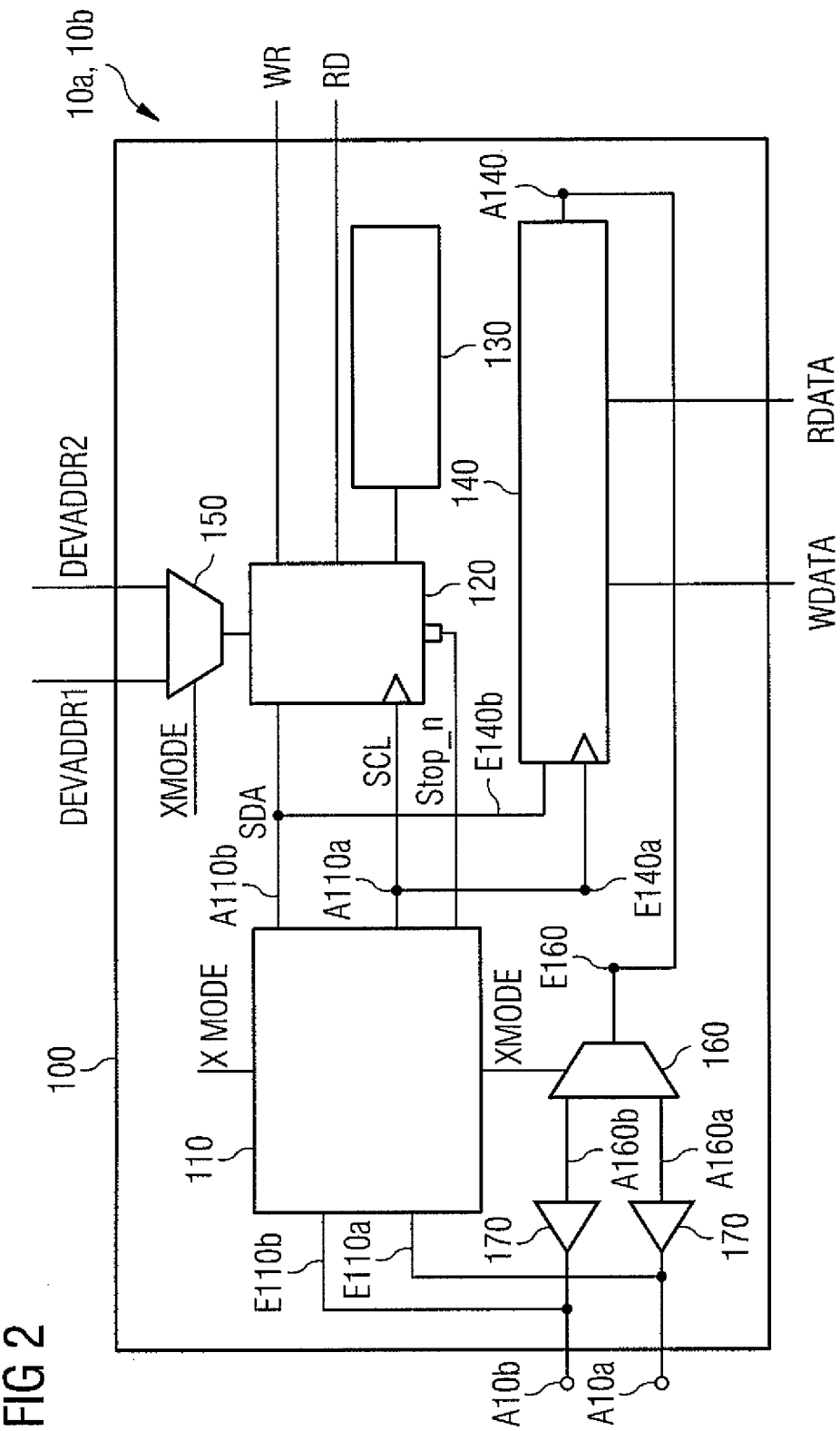
FIG. 2 shows an embodiment of a control device for assigning an address to an electronic component and for controlling a read and write access to the component.

FIG. 2 shows an embodiment of the control device 100 for assigning one of the possible component addresses DEVADDR1 or DEVADDR2 as the actual address of the component 10a, 10b and for controlling a read and write access to the respective memory device 300. The two possible component addresses DEVADDR1 and DEVADDR2 are stored in the memory device 400 or the memory device 500. The memory devices 400 and 500 can be ROM memories, for example, in which the possible component addresses DEVADDR1 and DEVADDR2 have been stored during the production of the components 10a and 10b.

The components 10a and 10b can be operated in a first or a second operating mode. In the first operating mode, a component is assigned the component address DEVADDR1, for example, and the component is assigned the address DEVADDR2 in the second operating mode. The first or second operating mode is set by the external connections of the terminals A10a and A10b. When the components 10a and 10b are operated in the first operating mode, the clock signal SCL is supplied to the terminal A10a, for example, by connecting the terminal A10a to the clock signal line 41 of the bus 40, and the data signal SDA is supplied to the terminal A10b by connecting the terminal A10b to the data signal line 42 of the bus 40. When the components 10a and 10b are operated in the second operating mode, the data signal SDA is supplied to the terminal A10a, for example, by connecting the terminal A10a to the data signal line 42 of the bus 40, and the clock signal SCL is supplied to the terminal A10b by connecting the terminal A10b to the clock signal line 41 of the bus.

Thus the first or second operating mode can be set depending on how the external terminal A10a is driven for application/output of the data signal SDA and for application of the clock signal SCL and how the external terminal A10b is driven for application/output of the data signal SDA and for application of the clock signal SCL.

The control device 100 comprises a mode recognition unit 110 that is constructed to determine whether the component is being operated in the first or the second operating mode. The mode recognition unit 110 has an input terminal E110a for application of the data signal SDA and for application of the clock signal SCL, as well as an additional input terminal E110b for application of the data signal SDA and for application of the clock signal SCL. The input terminal E110a is connected to the terminal A10a for application/output of the data signal and for application of the clock signal. The input terminal E110b is connected to the terminal A10b for application/output of the data signal and for application of the clock signal.

The mode recognition unit 110 evaluates the signals received at the input terminals E110a and E110b. The mode recognition unit 110 is constructed in such a manner that it determines based on the evaluation of the received signals whether the clock signal SCL is present at the terminal A10a and the data signal SDA is present at the terminal A10b, and the component is thus being operated in the first operating mode, or the data signal SDA is present at the terminal A10a and the clock signal SCL is present at the terminal A10b, and the opponent is thus being operated in the second operating mode.

The mode recognition unit 110 comprises an output terminal A110a for outputting the clock signal SCL. The mode recognition unit is constructed to output the clock signal SCL at the output terminal A110a, independently of whether the component is being operated in the first or second operating mode. The mode recognition unit further comprises an output terminal A110b for outputting the data signal SDA. The mode recognition unit is constructed in such a manner that it always outputs the data signal SDA at the output terminal A110b, the output being independent of whether the component is being operated in the first or the second operating mode.

Depending on whether it is determined that the component is being operated in the first or the second operating mode, the mode recognition unit 110 generates a mode signal XMODE that characterizes the detected operating mode. If the component is being operated in the first operating mode, the mode signal XMODE can be output at a 0-level, for example. On the other hand, if the mode recognition unit determines that the component is being operated in the second operating mode, it can generate the mode signal XMODE at a 1-level.

The control device 100 further comprises an address selection unit 150 for selecting the possible component address DEVADDR1 or the component address DEVADDR2. The selection of the possible component addresses is controlled by means of the mode signal XMODE. If the mode signal XMODE has the 0-level, for example, the address selection unit 150 selects the address DEVADDR1 and assigns it to the component. If the mode signal XMODE has the 1 level on the other hand, the address selection unit 150 selects the address DEVADDR2 and assigns it to the component.

The control device 100 further comprises a control unit 120 for controlling a read or write access to the memory device 300. For this purpose, the control unit 120 generates an internal read command RD or an internal write command WR.

A memory unit 140 is provided for intermediate storage of data received via the data signal SDA. The memory unit 140 can be a shift register, for example. The memory unit 140 is connected on an input side E140a to the clock output terminal A110a of the mode recognition unit 110 and on an input side E140b to the data output terminal A110b of the mode recognition unit 110. When a data stream is received at the data input terminal E140b, the data transmitted to the data output terminal A110b is stored in the memory unit 140.

The stored data contains the address of the slave component that the master component 30 would like to access. In order to determine which of the slave components 10a, 10b and 20 is to be accessed, the control unit 120 compares the component address supplied to it by the address selection unit 150 to the address interim-stored in the memory unit 140. If the two addresses agree, the component has been selected for a read or write access.

A counting unit 130 such as a bit counter is provided for counting the bits interim-stored in the memory unit 140. The shift register 140 is accessed for reading and writing by the control unit 120 when the bit counter 130 has counted up to the number of bits that can be stored in the shift register 140.

If the slave component 10a, 10b is to be accessed with a write access, the master component 30 generates a write signal, to be received by the control device 100, on the data line 42 of the bus. The control unit 120 then generates the internal write command WR. Data from the data signal SDA that is received at one of the external terminals A10a, A10b, depending on the operating mode of the electronic component, and is interim stored in the memory unit 140, is written as write data WDATA into the memory device 300.

If a read signal is transmitted to the slave component 10a, 10b by the master component 30 via the data line 42, the control unit 120 generates the internal read command RD. Thereupon, the data RDATA read out of the memory device 300 is interim-stored in the memory unit 140.

An output selection unit 160 for selecting one of the terminals A10a or A10b is provided for outputting the data interim-stored in the memory unit 140. For this purpose, the terminals A10a and A10b are constructed as bidirectional terminals for application of the first signal SCL such as the clock signal and for application and output of the second signal SDA such as the data signal. The output selection unit 160 is connected at an input side E160 to an output side A140 of the memory unit 140. Terminals A160a and A160b of the output selection unit 160 are connected via an amplifier 170 to the external component terminal A10a and the external component terminal A10b.

The output selection unit 160 is constructed in such a manner that, depending on the state of the mode signal XMODE, its input side E160 is connected to the terminal A160a and thus to the external terminal A10a, or to the terminal A160b and thus to the external component terminal A10b. If the mode signal XMODE has the 0-level, for example, and the electronic component is thus in the first operating mode, the data interim-stored in the memory unit 140 is output at the terminal A10b. On the other hand, if the mode signal XMODE has the 1-level and the component 10a, 10b is thus being operated in the second operating mode, the data interim-stored in the memory unit 140 is output by the output selection unit 160 at the terminal A10a, for example.

Figure 3:
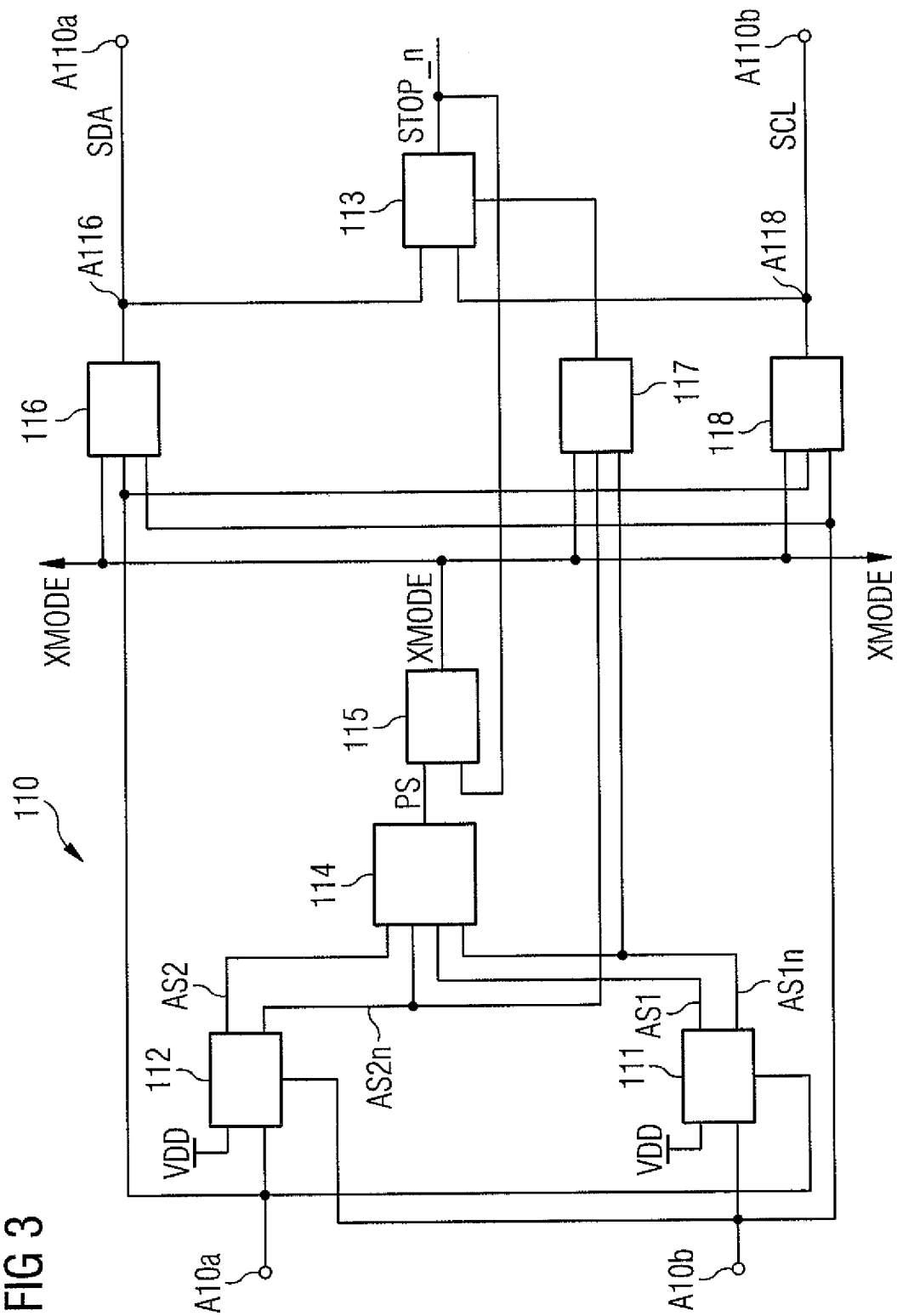
FIG. 3 shows an embodiment of a mode recognition unit for determining an operating mode of an electronic component.

FIG. 3 shows an embodiment of the mode recognition unit 110 for determining the operation of the component in the first or second operating mode. The mode recognition unit comprises a recognition unit 111 and a recognition unit 112 for determining the arrival of the beginning of a data stream at the terminal A10a or A10b of the component. Both recognition units are connected on the input side to the external component terminal A10a and the external component terminal A10b. Another terminal of the recognition unit is connected, for example, to a high-voltage level VDD, which characterizes a 1-level.

On the output side, the recognition unit 111 generates an output signal AS1 and an inverted output signal AS1n. The recognition unit 111 can be constructed in such a manner that it generates a level of the output signal AS1, a 1-level for instance, if it determines that the clock signal SCL is present at the terminal A10a of the component and the data signal SDA is present at the terminal A10b and the beginning of the data stream of the data signal SDA has arrived at the terminal A10b. The output signal AS1 is thus generated at the 1-level, for instance, if the component is being operated in the first operating mode and the beginning of the data stream has reached the terminal A10a.

On the output side, the recognition unit 112 generates an output signal AS2 and an inverted output signal AS2n. The recognition unit 112 can be constructed in such a manner that it generates a level of the output signal AS2, a 1-level for instance, if it determines that the data signal SDA is present at the terminal A10a of the component and the clock signal SCL is present at the terminal A10b of the component and the beginning of the data stream of the data signal SDA has arrived at the terminal A10a. The recognition unit 112 thus generates the level of the output signal AS2, a 1-level for example, if it determines that the component is being operated in the second operating mode and the beginning of the data stream has arrived at the external component terminal A10a.

In order to transmit a data signal from the master component 30 to the slave components 10a, 10b, the master component 30 can generate pulses of the clock signal SCL on the clock signal line 41, and pulses of the data signal SDA on the data signal line 42. The pulses alternate, for example, between a 1-level and a 0-level. A respective characteristic recognition sequence can be transmitted to mark a beginning of the data stream and the end of the data stream. Especially if an I2C bus is being used, a start sequence can be transmitted on the data signal line 42 to mark a beginning of the data stream and a step sequence can be generated to mark a stop of the data stream.

In one possible starting sequence, the level of the data signal SDA can change from a 1-level to a 0-level, while the clock signal SCL has a 1-level. In the subsequent data transmission, in which the address of the component to be addressed is transmitted first and then the payload data is transmitted, for example, the data signals SDA are transmitted or modified if the clock signal SCL has the 0-level, for instance. In a possible stop sequence, the data signal SDA can alternate from a 0-level to a 1-level during a 1-level of the clock signal SCL.

The recognition unit 111 generates the level of the output signals AS1 and AS1n to designate the first operating mode of the electronic component depending on whether the recognition unit 111 detects the start sequence of the data signal SDA, which marks the beginning of the data stream, at the terminal A10b, and the clock signal SCL at the terminal A10a. The recognition unit 112 generates a respective level of the output signals AS2 and AS2n to designate the second operating mode depending on whether the recognition unit 112 detects the start sequence of the data signal at the terminal A10a and the presence of the clock signal SCL at the terminal A10b.

An evaluation unit 114 is provided to evaluate the output signals AS1, AS1n, AS2 and AS2n. For example, the evaluation unit 114 can comprise a logic circuit. On the output side, it generates a storage signal PS, which is supplied to a downstream memory unit 115. Depending on the state of the storage signal PS, a 1-state or a 0-state can be stored in the memory unit 115, which can be constructed as a latch. For example, the 0-state designates that the component is in the first operating mode, while with the 1-state designates the second operating mode. The mode signal XMODE is generated at an output of the latch, depending on the state stored in the latch 115.

The mode recognition unit 110 further comprises switching units 116, 117 and 118. The switching units each have two inputs and one output, for example. Each of the switching units is supplied with the mode signal XMODE for controlling the connection of one of the inputs to the output. The switching unit 116 and the switching unit 118 are additionally supplied with the signal received at the terminal A10*a*, which can be the clock signal SCL or the data signal SDA, depending on the operating mode of the component, and the signal received at the terminal A10*b*, which can likewise be the clock signal SCL or the data signal SDA, depending on the operating mode of the component.

Depending on the mode signal XMODE, the switching unit 116 connects the output terminal A10*a* or the output terminal A10*b* to its output terminal A116. For this purpose, the switching unit 116 is constructed in such a manner that the data signal SDA is fed through to its output terminal A116. In the first operating mode of the component, the mode signal XMODE causes the switching unit 116 to connect the terminal A10*b* to the terminal A116 of the switching unit 116.

The mode of operation of the switching unit 118 is analogous. The switching unit 118 connects either the external terminal A10*a* or the external terminal A10*b* to its output terminal A118. The switching unit 118 is constructed in such a manner that, among the terminals A10*a* and A10*b*, it connects the terminal at which the clock signal SCL is present to the output terminal A118. The changeover between the two input terminals is controlled as a function of the mode signal XMODE.

The mode recognition unit 110 further comprises a recognition unit 113 that is constructed in order to recognize the stop sequence of the data stream. For this purpose, the data signal SDA and the clock signal SCL are supplied on the input side to the recognition unit 113. The output signal AS1*n* or the output signal AS2*n* is additionally supplied by the switching unit 117 to the recognition unit 113. The switching unit 117 is controlled by the mode signal XMODE. If the electronic component is being operated in the first operating state, for example, the output signal AS1*n* is fed through to the recognition unit 113. If the electronic component is being operated in the second operating mode, the output signal AS2*n* is fed through to the recognition unit 113.

The recognition unit 113 is constructed to detect the stop sequence that marks the end of the data stream. The recognition unit 113 generates a level of a reset signal STOP_n depending on whether a data transfer is currently in process or the data transfer has been terminated with the stop sequence. The reset signal STOP_n is fed back to the memory unit 115.

The memory unit 115 is constructed in such a manner that the input gate of the memory unit 115 for programming a state of the latch is opened if the stop sequence has been recognized by the recognition unit 113. During the start sequence of a subsequent data signal, the memory unit 115 is programmed according to the operating mode determined during the start sequence. The input gate of the memory unit 115 is closed after termination of the start sequence of the subsequent data set. Thus the input gate of the memory unit 115 is blocked during the actual data transfer. The latch 115 is therefore reprogrammed each time the start sequence, which marks the beginning of the data stream, is received at one of the external terminals A10*a* or A10*b*.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. An electronic component with assignment of an address to the component, comprising:

a first terminal for application of a clock signal and a data signal;

a second terminal, different from the first terminal, for application of the clock signal and the data signal, wherein the component is configured to be operated in a first operating mode, in which the clock signal is present at the first terminal and the data signal is present at the second terminal, and wherein the component is configured to be operated in a second operating mode, in which the data signal is present at the first terminal and the clock signal is present at the second terminal;

a mode recognition unit for determining the first and second operating mode of the component by evaluating which one of the clock signal and the data signal is present at the first terminal and the second terminal; and an address selection unit for assigning at least one first or second address to the component, wherein the address selection unit is configured so that the address selection unit assigns the first or the second address to the component, depending on the operating mode of the component, and wherein the component is configured to be addressed for performing both read and write access via each of the first and second address.

2. The electronic component according to claim 1, wherein the mode recognition unit comprises a first input terminal for application of the clock signal and the data signal and a second input terminal, different from the first input terminal, for application of the clock signal and the data signal, and wherein the first input terminal of the mode recognition unit is connected to the first terminal of the component and the second input terminal of the mode recognition unit is connected to the second terminal of the component.

3. The electronic component according to claim 2, wherein the mode recognition unit comprises an output terminal for outputting the clock signal, wherein the mode recognition unit outputs the clock signal at the first output terminal of the mode recognition unit, independently of whether the component is being operated in the first or second operating mode.

4. The electronic component according to claim 2, wherein the mode recognition unit comprises a second output terminal for outputting the data signal, and wherein the mode recognition unit outputs the data signal at the second output terminal of the mode recognition unit, independently of whether the component is being operated in the first or second operating mode.

5. The electronic component according to claim 1, wherein the mode recognition unit generates a mode signal depending on the detected first or second operating mode.

6. The electronic component according to claim 1, wherein the first and second terminals are each formed as a terminal for application of a clock signal and application or output of a data signal, wherein the component is constructed as a component for performing a read and write access, wherein the component is constructed in such a manner that a read and write access to the component is controlled temporally by the clock signal and, in case of a write access to the component, data is written to the component depending on the data signal and, in case of a read access, data is read out of the component.

7. The electronic component according to claim 2, wherein the first and second terminals are each formed as a terminal for application of a clock signal and application or output of a data signal, wherein the component is constructed as a component for performing a read and write access, wherein the component is constructed in such a manner that a read and write access to the component is controlled temporally by the clock signal and, in case of a write access to the component, data is written to the component depending on the data signal and, in case of a read access, data is read out of the component, and the electrical component further comprising:

a memory unit for interim storage of data from the data signal, wherein the memory unit is connected on the input side to the data signal terminal of the mode recognition unit, and wherein the memory unit is constructed in such a manner that an address transmitted to the component along with the data signal can be stored in the memory unit.

8. The electronic component according to claim 7, comprising:

a control unit for generating a read command or a write command, wherein the control unit is constructed in such a manner that the control unit compares the address selected by the address selection unit to the address stored in the memory unit and generates the read command or the write command if the control unit determines that the stored address matches the selected address.

9. The electronic component according to claim 8, comprising a memory device for storing data, wherein the data interim-stored in the memory unit is stored in the memory device if the control unit generates the write command, and wherein the data stored in the memory device is interim-stored in the memory unit if the control unit generates the read command.

10. The electronic component according to claim 9, comprising:

an output selection unit for selecting the first terminal or the second terminal of the component in order to output the data signal, wherein the output selection unit is connected on the input side to an output side of the memory unit and is connected on the output side to the first terminal and the second terminal of the component, and wherein the output selection unit is constructed in such a manner that, depending on the mode of the mode signal, the output selection unit connects the input side of the output selection unit to the first terminal or the second terminal of the component.

11. The electronic component according to claim 1, wherein the first terminal and the second terminal of the component are each constructed as a terminal for connecting the component to an I2C bus.

12. The electronic component according to claim 2, wherein the mode recognition unit comprises a first recognition unit and a second recognition unit for determining the arrival of a beginning of a data stream at the first terminal or the second terminal of the component, wherein the first recognition unit is constructed in such a manner that the first recognition unit generates a level of a first output signal, if the component is being operated in the first operating mode and the first recognition unit determines the arrival of the beginning of the data stream at the second terminal of the component, and wherein the second recognition unit is constructed in such a manner that the second recognition unit generates a level of a second output signal, if the component is being operated in the second operating mode and the second recognition unit determines the arrival of the beginning of the data stream at the first terminal of the component.

13. The electronic component according to claim 5, wherein the mode recognition unit comprises an evaluation unit for evaluating the level of the first output signal and the level of the second output signal, wherein the mode recognition unit comprises a memory unit for storing a data item, wherein the value of the data item is stored as a function of the evaluated respective level of the first and second output signals, and wherein the memory unit generates the mode signal on the output side depending on the value of the data item stored in the memory unit.

14. The electronic component according to claim 12, wherein the mode recognition unit comprises a third recognition unit for determining the arrival of an end of the data stream at the terminal or of the component, and wherein the data item is stored in the memory unit if the third recognition unit has determined the arrival of the end of the data stream and the first or second recognition unit detects the arrival the beginning of a subsequent data stream.

15. The electronic component according to claim 14, wherein at least one of the first, second and third recognition units is constructed as an edge-triggered flip-flop, and wherein the memory unit is constructed as a level-triggered register.

* * * * *